United States Patent [19]

Ewen

[11] Patent Number: 4,993,768
[45] Date of Patent: Feb. 19, 1991

[54] COMBINED SHOVEL AND UTILITY DEVICE

[75] Inventor: James Ewen, Tucson, Ariz.

[73] Assignee: Ronald C. Lamparter, Grosse Pointe Shores, Mich.

[21] Appl. No.: 418,243

[22] Filed: Oct. 6, 1989

[51] Int. Cl.⁵ ............................ A01B 1/20; E01H 5/02
[52] U.S. Cl. .................................. 294/51; 7/116; 238/14; 294/54.5; 294/57
[58] Field of Search .............. 294/49, 51, 54.5, 55, 294/57, 59, 2; 7/100, 114–116, 169, 170; 15/236.02, 257.1; 37/117.5, 196, 241, 264, 265, 285; 172/375; 238/14; 254/104, 131.5; 280/19

[56] References Cited

U.S. PATENT DOCUMENTS

| | | | |
|---|---|---|---|
| 557,988 | 4/1896 | Gageby | 294/49 |
| 1,061,980 | 5/1913 | Cahn | 294/51 X |
| 1,218,767 | 3/1917 | Heginbottom | 238/14 |
| 1,339,612 | 5/1920 | Wilkins | 238/14 |
| 1,795,298 | 3/1931 | Dulaney | 294/55 |
| 3,289,939 | 12/1966 | Martinov | 238/14 |
| 3,918,638 | 11/1975 | Nelson | 238/14 |
| 4,193,626 | 3/1980 | Vondracek | 294/54.5 X |
| 4,275,476 | 6/1981 | Hopkins et al. | 15/236.02 |
| 4,280,727 | 7/1981 | Germain | 294/54.5 |
| 4,300,722 | 11/1981 | Simmons | 268/14 |

FOREIGN PATENT DOCUMENTS

| | | | |
|---|---|---|---|
| 3235509 | 3/1984 | Fed. Rep. of Germany | 7/116 |
| 618437 | 3/1927 | France | 294/59 |

Primary Examiner—Johnny D. Cherry
Attorney, Agent, or Firm—Reising, Ethington, Barnard, Perry & Milton

[57] ABSTRACT

A combined shovel and utility device useful in performing a variety of functions particularly as associated with a vehicle including during emergency situations such as a snow shovel, a large ice scraper, a wheel traction mat, a work mat, an emergency sign or an emergency sled.

4 Claims, 3 Drawing Sheets

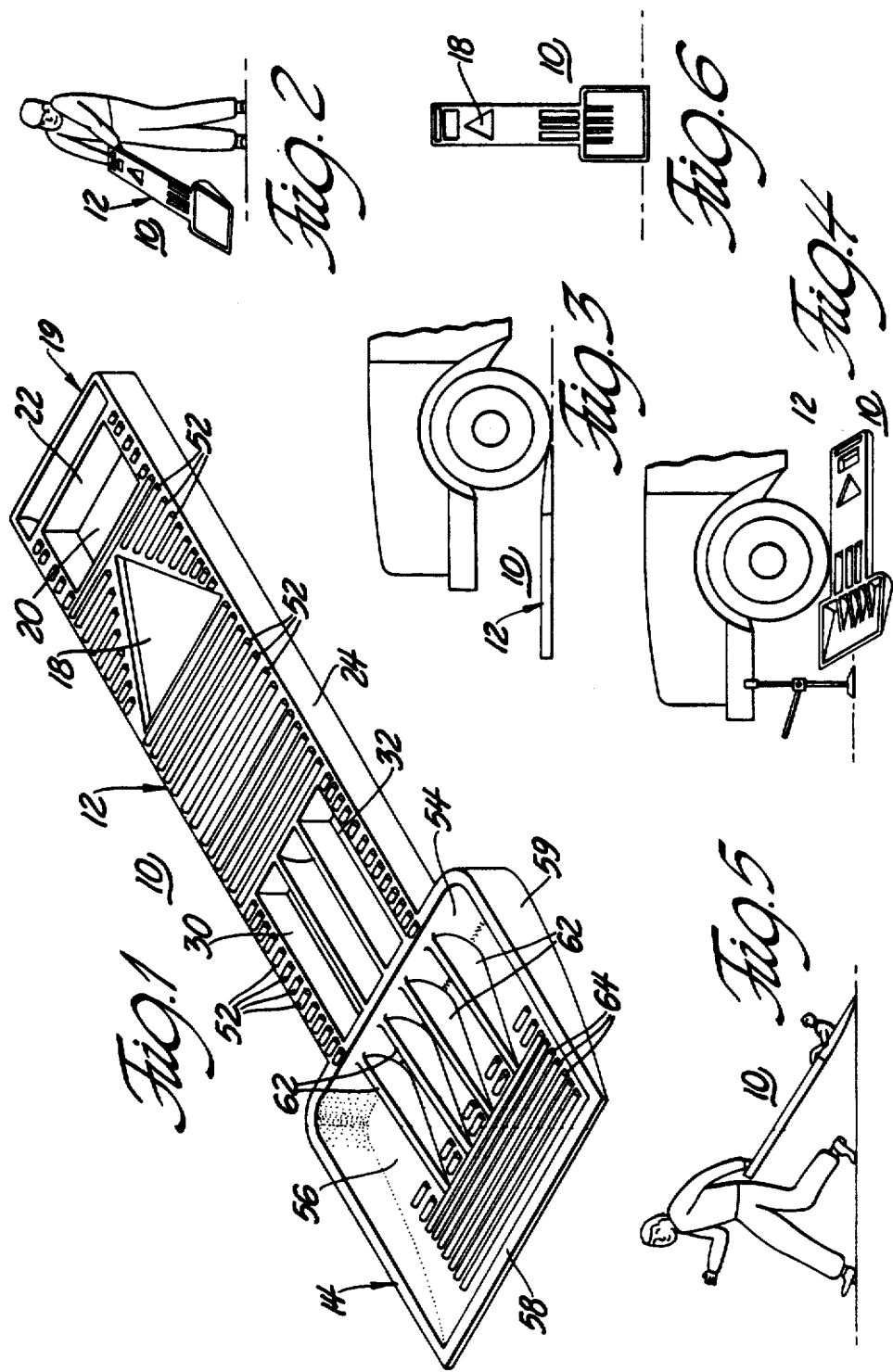

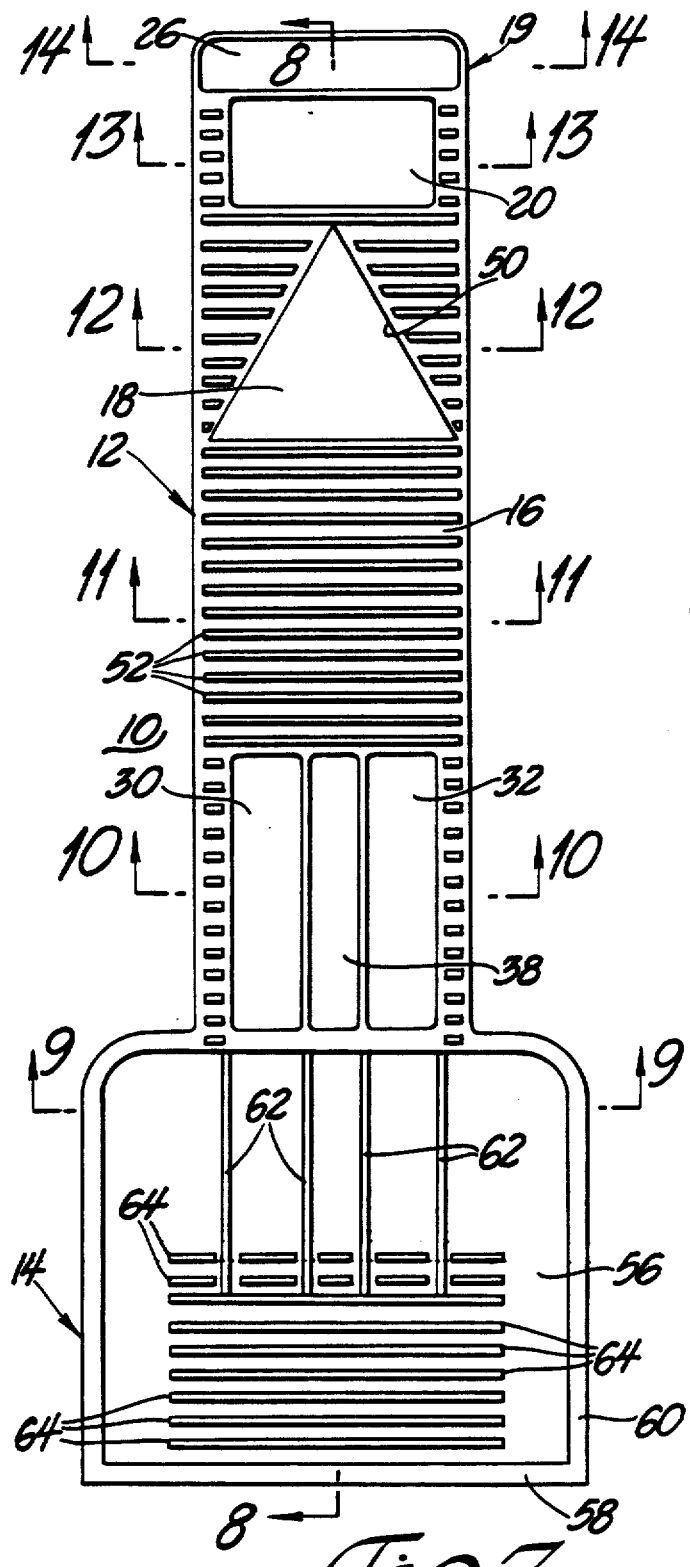
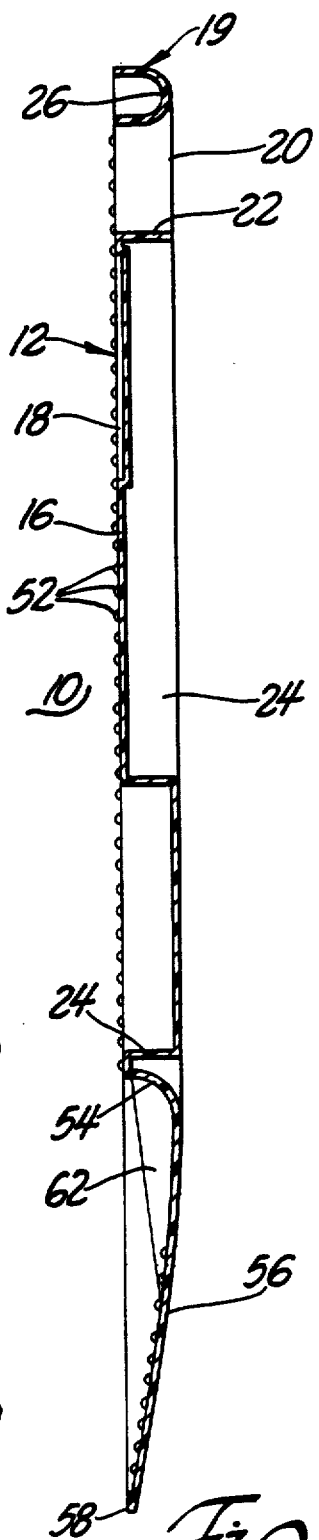

COMBINED SHOVEL AND UTILITY DEVICE

BACKGROUND OF THE INVENTION

The present invention relates to a combined shovel and utility device which is primarily intended to be carried in a vehicle and which can be used in a variety of emergency situations apt to be encountered in such a vehicle. While such a device may be of a variety of sizes, it is shown and will be described as being of a size which permits it being stored, for instance, in a vehicle trunk.

As will be apparent from the detailed description which follows, the subject device may be used as a snow shovel, a large ice scraper, a wheel traction mat, a work mat, an emergency sign or an emergency sled.

The device of the subject invention is of an integrally molded plastic design adapted to contain various structural features enabling its various functional uses.

PRIOR ART

Applicant is unaware of any prior art device which functions in the manner intended by the subject invention. However, in the course of examining prior patented devices, the following were the closest devices noted:

U.S. Pat. No. 3,024,547 Harrison
U S. Pat. No. 3,088,230 Bonic
U.S. Pat. No. 3,522,952 Uttenthaler
U.S. Pat. No. 3,897,078 Melnick
U.S. Pat. No. 3,938,819 Martin
U.S. Pat. No. 4,709,432 Barrick
U.S. Pat. No. 4,727,609 Smith

SUMMARY OF THE INVENTION

It is the primary object of the subject invention to provide a combined shovel and utility device which answers many of the emergency needs which can be experienced in the operation of a vehicle. Such emergency conditions can include deep snow or loose soil causing the vehicle to be stuck or bogged down; a flat tire or other vehicle malfunction requiring a sturdy surface or mat upon which to work. Or, in the alternative, the device can be used as an emergency reflective sign to warn other vehicles of a stalled or inoperative vehicle. The device also can be used as a sled to haul a child or moderately injured person away from a disabled vehicle.

The combined shovel and utility device comprises an elongated rectilinear body having a length greater than its width with a shovel scoop integrally formed at one end of said body and which body includes a generally planar main wall. The shovel scoop extends laterally beyond said body and has a bottom wall projecting longitudinally beyond the body. The bottom wall includes a rear portion disposed proximate to and vertically spaced below the main body wall. The bottom wall of the scoop inclines upwardly from said rear portion and terminates in a forward edge longitudinally aligned with the body wall. An integral wall extends around and projects upwardly from the periphery of the bottom wall of the shovel scoop and has an upper edge generally co-planar with the upper surface of the body wall. The body includes a transversely recessed portion to provide a handle at the end of the body remote from the shovel scoop. Various traction and reinforcing ribs are formed on generally opposite sides of the body to both strengthen the shovel and to enhance certain of tee utility functions.

Other structural features of the invention whereby the various functions are achieved will be clearly understood from the following description of a preferred embodiment of the invention selected for the purposes of illustration and having reference to the drawings, wherein:

BRIEF DESCRIPTION OF THE DRAWINGS

FIG. 1 is a perspective view of the combined shovel and utility device.

FIGS. 2 through 6 illustrate various uses of the device.

FIG. 7 is a plan view of the device.

FIG. 8 is a sectional view along line 8—8 of FIG. 7.

PREFERRED EMBODIMENT

Figure 9:
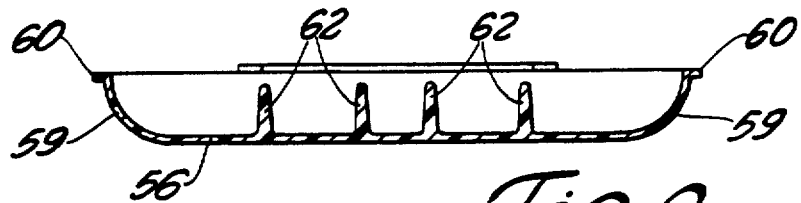
FIGS. 9 through 14 are sectional views along lines 9—9, 10—10, 11—11, 12—12, 13—13 and 14—14 of FIG. 7.

The combined shovel and utility device is indicated generally at 10 and includes a rectilinear main body portion 12 and an integral scoop shovel portion 14 disposed at one end thereof. While the precise size or dimensions of device 10 are not critical to the invention, it is intended to be of a size and proportion to fit into, for example, the trunk of an automobile. For illustrative purposes, the shovel dimensions may be as follows: over all length of the device including the shovel 32 inches; width of the shovel scoop 11 inches; length of the shovel scoop 10 inches; width of the body portion 6 inches; and the overall thickness of the body portion 1⅜ inches.

As best seen in FIGS. 7 and 8, the main body portion 12 includes a wall 16 which extends substantially throughout the length of the body portion 12. It is to be understood that, with the exception of an inserted reflector member 18, the entire device is molded of a single piece of high strength plastic and thus, requires no assembly other than the addition of the aforementioned reflector 18.

While various high strength plastic materials may be used to mold the subject device, a suggested material is a mixture of polycarbonate and polyester marketed under the trade name Xenoy by the General Electric Corporation.

For purposes that will be understood as the description proceeds, various openings, recesses, ridges and ribs are integrally molded in body portion 12 and scoop 14.

In order to provide a handle 19 to be gripped by the user, wall 16 is molded with an opening 20 near the end of the body portion remote from the shovel scoop 14. Opening 20 is defined by a peripherally depending rectangular wall 22.

As best represented in FIG. 1 the entire outer periphery of main body portion 12 is defined by a depending wall portion 24 which, along with other recesses and walls, intra, rigidifies the shovel device to resist bending in use. Referring to FIGS. 1, 7 and 8, it will be noted that body wall 16, handle opening wall 22 and outer wall 24 define an inverted U-shaped section 26 which strengthens the handle portion of the device.

Figure 14:
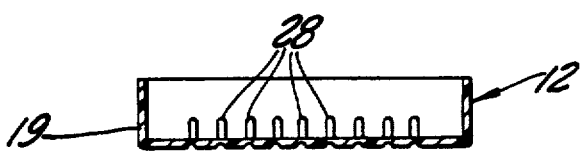

Device handle 19 is formed by the laterally rearmost section of wall 22 which extends rearwardly and upwardly to define the U-shaped cross section as best seen in FIG. 8. As seen in FIG. 14, laterally spaced grooves 28 are formed in the underside of handle 19 to provide a non-slipping handle grip.

Figure 10:
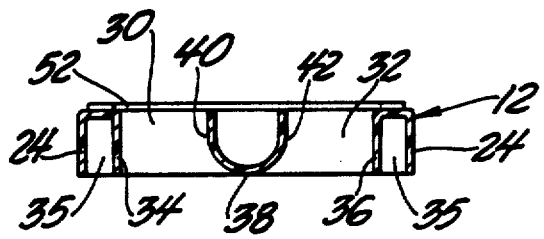

Proceeding forwardly along body portion 12 toward the shovel scoop 14, it will be noted that recesses 30 and 32 are formed in the wall 16 to again strengthen the body portion proximate its juncture with the shovel scoop. As seen in FIGS. 7 and 10, recesses 30 and 32 include depending peripheral wall portions 34,36 and a central body portion 38. The laterally innermost recess walls 40 and 42 are joined to form an upwardly opening arcuate section 38. Also, the recess wall portions 34,36 join with wall 16 and peripheral body wall 24 to form downwardly opening reinforcing sections 35 as shown in FIG. 10.

Figure 11:
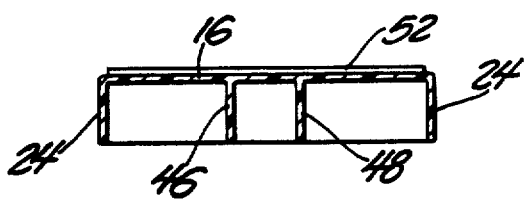

Referring to FIG. 11, laterally spaced center walls 46 and 48 depend from the underside of wall 16 and extend longitudinally between recesses 30 and 32 and handle recess 20. The depending center walls 46 and 48 further stiffen the body to limit bending under load.

Figure 12:
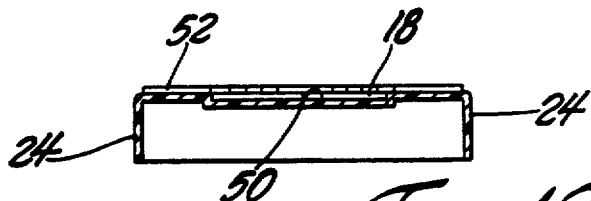
Figure 13:
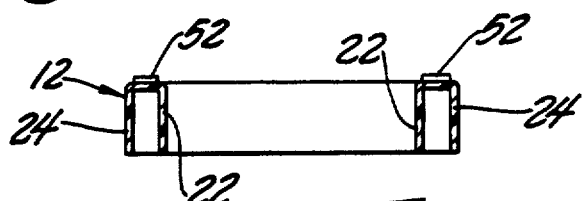

Referring to FIGS. 7 and 12, it will be seen that the body wall 16 is provided with a shallow recess 50 which forms a cavity to receive reflector 18 which is also formed of a suitable plastic material and is intended to be generally flush with the upper surface of wall 16. Reflector 18 is preferably cemented within body cavity 50

In order to provide a corrugated-like upper surface to enable the device to function as a traction mat, a plurality of laterally extending upstanding ridges 52 are molded in the upper surface of wall 16 of body portion 12. Ridges 52 are spaced throughout the length of wall 16 with their lateral extent only being interrupted by handle opening 20, reflector cavity 50 and recesses 30,32.

Reference is now made to the shovel scoop 14 as best seen in FIGS. 1, 7 and 8. It is to be noted that shovel scoop portion 14 extends laterally or transversely beyond the body portion 12 and includes an integral rear wall portion 54 which projects forwardly and inclines upwardly to define a bottom wall portion 56. The upwardly inclined outer most end of bottom portion 56 terminates in a relatively flat and sharp end edge 58 which is generally co-planar with body wall 16. As best seen in FIG. 9, bottom wall 56 of the shovel portion flares upwardly to provide peripheral side walls 59, the upper edge 60 of which again is co-planar with the body wall 16. Upstanding and laterally spaced ribs 62 project upwardly from bottom wall portion 56 to provide longitudinal reinforcement of the shovel scoop. Once again, laterally extending ridges 64 are formed on the upper surface of bottom wall 56 of the shovel scoop The ridges 64 also provide traction when the device is used as a traction mat.

The various uses of the subject device are schematically represented in FIGS. 2–6. Such uses will now be briefly described.

As seen in FIG. 2, the device may be used as a shovel, or ice scraper. Another use depicted in FIG. 4 is as a work mat to provide a surface on which a person may kneel or to provide a solid base for supporting a wheel jack. The shovel end can be implanted in snow or in the ground, as seen in FIG. 6, to provide an emergency reflector to warn oncoming traffic of a disabled vehicle. The device as depicted in FIG. 5 may provide a small sled for pulling a child away from a disabled vehicle in a manner easier than carrying such child in one's arms. Referring to FIG. 3, the device may be used as a traction mat wherein the side of the device containing the various ridges 52 and 64 are placed against the ground and in front of one or more of the driving wheels whereby the wheels are provided with added traction to enable the vehicle to be driven out of a slippery or loose surface.

It is apparent that other modifications of the subject device may be made within the intended scope of the invention as set forth in the hereinafter appended claims.

What is claimed is:

1. A combined shovel and utility device comprising an elongated rectilinear body (12) having a length greater than its width, a shovel scoop (14) integrally formed at one end of said body, the width of said body being approximately one-half the width of said scoop, said body having a generally planar top wall (16), the shovel scoop extending transversely beyond said body and having a bottom wall (56) projecting longitudinally beyond said body, the bottom wall having a rear wall portion (54) projecting upwardly and terminating at said top wall (16), the bottom wall inclining upwardly from said rear wall portion (54) and terminating in a forward edge (58) longitudinally aligned with and extending transversely beyond said top wall (16), an integral wall (59) extending around and projecting upwardly from the periphery of the bottom wall (56) and having an upper edge (60) generally coplanar with said top wall (16), said top wall (16) including a transverse opening (20) forming a handle (19) at the end of the body remote from the shovel scoop, a pair of laterally spaced recesses (30, 32) formed by body walls (34, 40) and (36, 42) and a longitudinally extending upwardly opening U-shape section (38) of said body (12) transversely spacing said recesses, said U-shape section having one end terminating proximate the rear wall portion (54) of the shovel scoop.

2. A combined shovel and utility device as set forth in claim 1 wherein the body (12) includes wall portions (24) depending from the periphery of the body top wall (16), said recesses being longitudinally elongated and laterally spaced inwardly of the depending wall portions (24) and coacting therewith and with said body wall (16) to form downwardly opening U-shape body cross sections (35), one end of each of said recesses (30, 32) terminating proximate the rear wall portion (54) of the shovel scoop.

3. A combined shovel and utility device as set forth in claim 2 wherein the bottom wall (56) of the shovel scoop includes a plurality of laterally spaced and longitudinally extending reinforcing ribs (62) projecting forwardly from said rear wall portion (54) and projecting upwardly from said bottom wall.

4. A combined shovel and utility device as set forth in claim 3 wherein said bottom wall (56) of the shovel scoop includes a plurality of transversely extending and raised ridges (64), said ridges being longitudinally spaced and disposed intermediate the reinforcing ribs (62) and the scoop forward edge (58).

* * * * *

UNITED STATES PATENT AND TRADEMARK OFFICE
CERTIFICATE OF CORRECTION

PATENT NO. : 4,993,768

DATED : February 19, 1991

INVENTOR(S) : James G. Ewen

It is certified that error appears in the above-identified patent and that said Letters Patent is hereby corrected as shown below:

Column 2, line 1   Delete "tee" and insert -- the --.

Column 2, line 33 Delete "1-2/3" and insert -- 1-1/4 --.

Column 3, line 26 After "50" include --.--.

Column 3, line 51 After "scoop" insert --.--.

Signed and Sealed this

Eighteenth Day of August, 1992

Attest:

DOUGLAS B. COMER

*Attesting Officer*    Acting Commissioner of Patents and Trademarks